2 Sheets—Sheet 1.
N. BRITTAN.
Lightning Rod.
No. 2,601.
Reissued May 14, 1867.
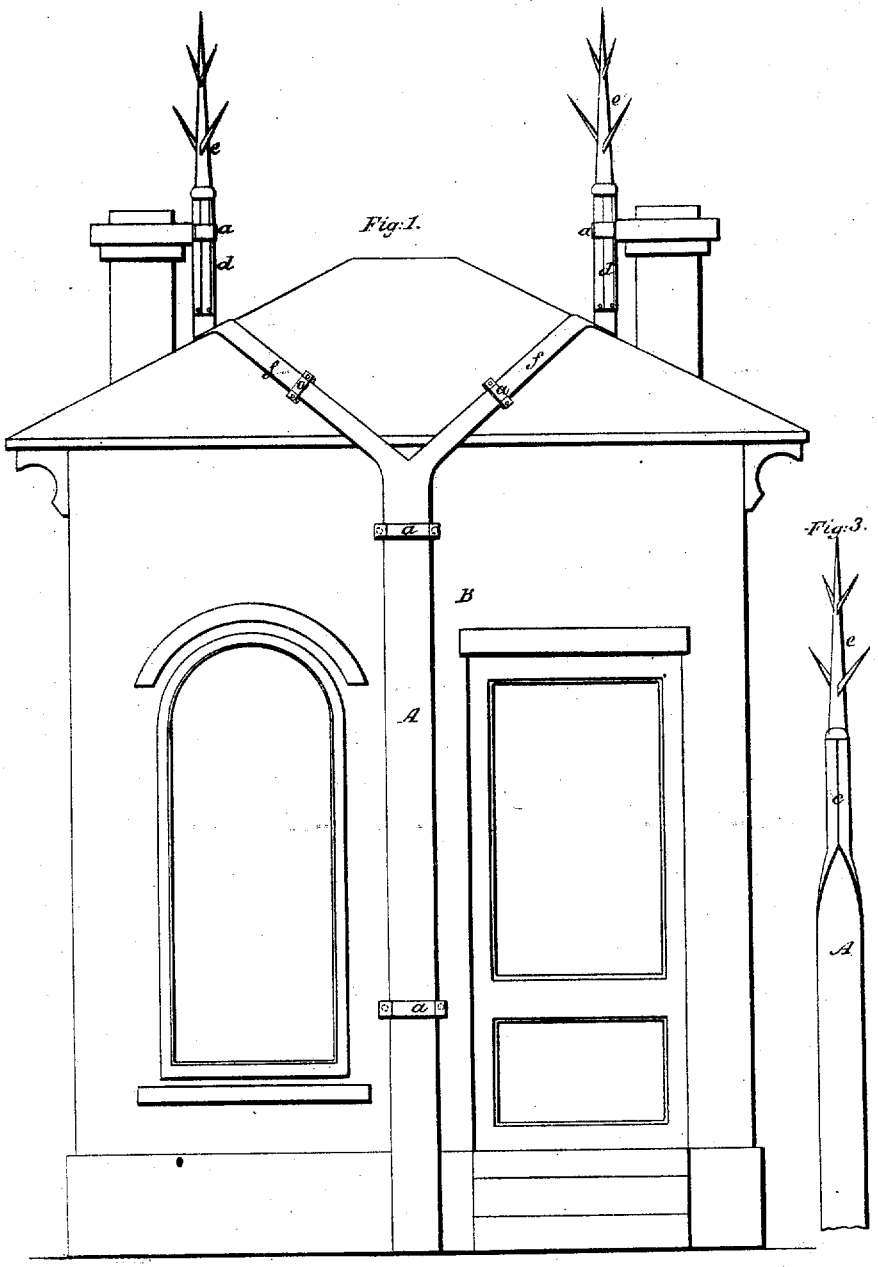
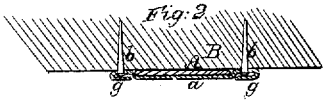
Witnesses:
J. W. Coombs.
Henry Morris.
Inventor.
N. Brittan
per Munn & Co
Attorneys.
N. PETERS. Photo-Lithographer, Washington, D. C.

2 Sheets—Sheet 2.

N. BRITTAN.

Lightning Rod.

No. 2,601.

Reissued May 14, 1867.

Witnesses.
J. W. Coombs.
Henry Morris.

Inventor.
N. Brittan
per Munn & Co.
Attorneys.

N. PETERS. Photo-Lithographer, Washington, D. C.

United States Patent Office.

N. BRITTAN, OF CHICAGO, ILLINOIS.

*Letters Patent No.* 43,565, *dated July* 19, 1864; *reissue No.* 2,601, *dated May* 14, 1867.

IMPROVEMENT IN LIGHTNING-RODS.

The Schedule referred to in these Letters Patent and making part of the same.

TO ALL WHOM IT MAY CONCERN:

Be it known that I, N. BRITTAN, of Chicago, in the county of Cook, and State of Illinois, have invented a new and improved Electrical Conductor for protecting buildings from injury by lightning; and I do hereby declare the following to be a full, clear, and exact description thereof, reference being had to the accompanying drawings, making part of this specification, and to the letters of reference marked thereon, like letters indicating like parts wherever they occur.

My invention consists in making a rod or conductor, which, when finished, shall consist of a single continuous flat strip of copper, and having that portion which projects above the building made tubular, in order to render it rigid and self-sustaining.

To enable others skilled in the art, I will proceed to describe my invention and the manner of using the same.

Figure 1 is an elevation of a building with my improved conductor attached, the latter being represented on a larger scale than the building.

Figure 2 is a transverse horizontal section of the conductor, showing the method of its attachment to the building.

Figures 3 and 4 are elevations of the upper portions of the rod, showing special modes of forming the tips or points.

Figure 4:
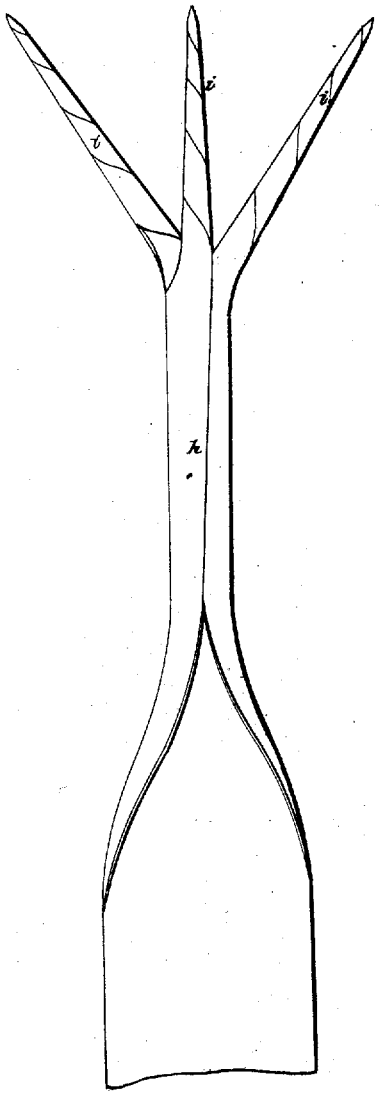
Figure 5:
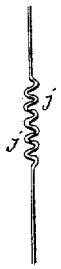
Figure 5 is an edge view of a portion of the conductor, showing a mode of providing for its contraction.

Various methods of constructing and putting up electrical conductors, or lightning-rods, have been from time to time invented. To the various styles of rods heretofore used there are serious objections, which by my present invention I propose to obviate. As is well known, there are three essential requisites to a good conductor: first, it must be composed of a good conducting material; second, it must be continuous; and third, it should have the greatest possible amount of surface compatible with the amount of metal used, and at the same time be not too weak. In addition to these, a rod for this purpose should be so constructed as to be compact, easily transported, and readily put up, without the use of cumbrous or unnecessary tools or fixtures at the place of its erection. All these advantages are united in my present invention. Copper rods have heretofore been constructed of wire twisted into a rope; also of strips of copper united in sections, the union being effected by simple contact, as in the British naval vessels, and by brazing, soldering, or riveting. Copper rods have also been formed of continuous strips of sheet copper, twisted or corrugated in various styles, or made tubular. These latter rods while being continuous, do not possess the other requisites and advantages, and for these reasons: first, if the sheet or strip be formed into a tube, or be twisted or corrugated at the factory, it cannot be rolled or doubled up for transportation without injury, and hence it has been the practice to carry the machinery for bending, twisting, or corrugating it along with the rod from place to place, and to prepare so much of the rod as was required at each particular place where it was to be put up, thus greatly increasing the labor, time, and expense of putting up such rods; second, such rods when bent, as all rods must be more or less, to conform to the shape of the building, are invariably injured by being more or less crushed where bent to pass over the edge of the roof and at other angles. In such cases the rod, whether it be tubular or twisted, or corrugated in the form of a letter S, as is frequently the case, will be flattened and crushed at the point where it is thus bent, so that the sides will be brought into contact, which in effect greatly lessens the conducting surface and power of the rod at those points, thereby greatly increasing the danger or probability of the lightning's leaving the rod and striking the building, or becoming so intensified as to fuse the rod and destroy it, in which case it is still more likely to injure the building. To remedy or obviate these difficulties or objections, I construct my improved rod as follows:

I construct the rod A, of any required length, of a continuous strip of pure copper, using preferably the cold-rolled Lake Superior copper for that purpose. This strip is neither twisted nor corrugated, but is left perfectly flat and plain, and for convenience of transportation may be coiled into a large roll like ribbons. In this manner I convey it to the place where the rod is to be erected, and there cut off the required length. So much of the rod as is intended to project above the roof I then form into a tube as shown at *c* of fig. 3, and unite the edges by solder to render it still more rigid. This being properly secured, I then extend the flat strip A over the roof and down the side of the building in the usual manner, and insert the lower end in the ground to the proper depth, the form of the flat strip permitting it to be so bent as to accommodate itself to the form or inequalities of the surface, without in any way or manner lessening its extent of surface or conducting power. Where a house is provided with chimneys on opposite sides, as represented in fig. 1, the upper portion of the rod may be divided into two strips, the upper end of each being formed into a tube, and provided with a point, as there represented. In securing the rod I place it in immediate contact with the building, as represented in fig. 2, B representing a portion of the wall of the building, and fasten it at short distances, by means of a strip, *a*, of the same material as the rod, the strip *a* being placed transversely across the face of the rod, and having a nail, *b*, driven through it into the wall on each side of the rod A, the ends of the strip *a* being left of sufficient length to be bent or doubled back over the head of the nails as represented at *g* of fig. 2. By these means the rod A is kept in close contact with the building, and is thereby protected from injury and also from becoming loosened by the wind. In order to compensate for the contraction of the rod at low temperatures, a portion of it may be corrugated transversely, as represented in fig. 5. If desired the projecting portion, instead of being formed of a portion of the rod itself, as represented in fig. 3, may be composed of a separate tube, either plain or fluted, as represented at *d* of fig. 1, and then attached permanently to the rod A by rivets or solder, any approved form of point being secured to its upper end. Or, if preferred, the upper portion, after being formed into a tube, as represented by *h* of fig. 4, may then be divided into three or more strips cut in a tapering form, each of which may then be coiled spirally into separate points, as represented at *i* of said figure. By these means I produce a rod in which are embodied all the essential requisites of a perfect conductor. It is continuous, presenting a surface of great extent in proportion to the amount of metal used, and is of uniform conducting capacity throughout its entire length. It is compact, and therefore easily transported, and is put up without the use of complicated or cumbrous machinery, and is extremely simple, cheap, and efficient.

Having thus fully described my invention, what I claim, is—

1. A lightning-conductor consisting of a single continuous flat strip of copper, as herein shown and described.

2. In combination with the single continuous flat strip A, I claim the tubular projecting portion *c*, as herein set forth.

3. The points *i*, formed of spiral coils, when combined in one piece with the tubular portion *h*, and the continuous flat strip A, as herein shown and described.

N. BRITTAN.

Witnesses:
D. J. LYON,
L. L. BENEL.